(12) United States Patent
Park et al.

(10) Patent No.: US 9,966,600 B2
(45) Date of Patent: *May 8, 2018

(54) PRECURSOR FOR PREPARING LITHIUM COMPOSITE TRANSITION METAL OXIDE, METHOD FOR PREPARING THE PRECURSOR, AND LITHIUM COMPOSITE TRANSITION METAL OXIDE

(71) Applicant: LG Chem, Ltd., Seoul (KR)

(72) Inventors: Byung Chun Park, Daejeon (KR); Seong Hoon Kang, Daejeon (KR); Minsuk Kang, Daejeon (KR); Wang Mo Jung, Daejeon (KR); Ho Suk Shin, Daejeon (KR); Sang Min Park, Daejeon (KR); Geungi Min, Daejeon (KR)

(73) Assignee: LG Chem, Ltd. (KR)

( * ) Notice: Subject to any disclaimer, the term of this patent is extended or adjusted under 35 U.S.C. 154(b) by 375 days.

This patent is subject to a terminal disclaimer.

(21) Appl. No.: 14/559,155

(22) Filed: Dec. 3, 2014

(65) Prior Publication Data

US 2015/0090926 A1  Apr. 2, 2015

Related U.S. Application Data

(63) Continuation of application No. PCT/KR2013/005903, filed on Jul. 3, 2013.

(30) Foreign Application Priority Data

Jul. 9, 2012 (KR) ........................ 10-2012-0074278

(51) Int. Cl.
*H01M 4/505* (2010.01)
*H01M 4/525* (2010.01)
*H01M 10/052* (2010.01)
*C01G 53/00* (2006.01)

(52) U.S. Cl.
CPC ............ *H01M 4/505* (2013.01); *C01G 53/00* (2013.01); *C01G 53/006* (2013.01); *C01G 53/54* (2013.01); *H01M 10/052* (2013.01); *C01P 2004/03* (2013.01); *C01P 2004/61* (2013.01); *C01P 2004/80* (2013.01); *C01P 2006/11* (2013.01); *C01P 2006/40* (2013.01); *H01M 4/525* (2013.01); *Y02T 10/7011* (2013.01)

(58) Field of Classification Search
CPC ............................. C01G 53/04; C01G 53/006
See application file for complete search history.

(56) References Cited

U.S. PATENT DOCUMENTS 7,579,114 B2   8/2009  Ohzuku et al.
9,601,770 B2 *  3/2017  Park ...................... H01M 4/505

2003/0054251 A1   3/2003  Ohzuku et al.
2007/0009424 A1   1/2007  Ohzuku et al.
2009/0302267 A1 * 12/2009  Albrecht ............. C01G 53/006
                                                             252/182.1
2011/0089367 A1   4/2011  Shin et al.
2011/0163272 A1 *  7/2011  Ono ..................... H01M 4/0416
                                                             252/500
2012/0043499 A1   2/2012  Shin et al.

FOREIGN PATENT DOCUMENTS

| CN | 101998932 A | 3/2011 |
| CN | 102306776 A | 1/2012 |
| EP | 2325930 A1 | 5/2011 |
| JP | 2003086182 A | 3/2003 |
| KR | 20060046769 A | 5/2006 |
| KR | 10-0633287 B1 | 10/2006 |
| KR | 20080088177 A | 10/2008 |
| KR | 2009-0062254 A | 6/2009 |
| KR | 2009-0078128 A | 7/2009 |
| KR | 2009-0105868 A | 10/2009 |
| KR | 20090105868 A | 10/2009 |
| KR | 20110073630 A | 6/2011 |
| TW | 201000407 A | 1/2010 |

(Continued)

OTHER PUBLICATIONS

Noguchi, et al., "Effect of Bi oxide surface treatment on 5V spinel LiNi0.5Mn1.5-xTixO4." Science Direct; Journal of Power Sources, vol. 174, No. 2, Dec. 6, 2007, pp. 359-365.
Zhong, et al., "Effects of Al substitution for Ni and Mn on the electrochemical properties of LiNi0.5Mn1.5O4." Electrochimica Acta, Elsevier Science Publishers, vol. 56, No. 18, Mar. 27, 2011, pp. 6654-6561.
Zhong, et al., "Structural electrochemical and thermal stability investigations on LiNi0.5-xAl2xMn1.5-xO4 (0≤2x≥1.0) as 5 V cathode materials." Journal of Power Sources, vol. 216, Jun. 6, 2012, pp. 368-375.

(Continued)

*Primary Examiner* — Peter F Godenschwager
(74) *Attorney, Agent, or Firm* — Lerner, David, Littenberg, Krumholz & Mentlik, LLP

(57) ABSTRACT

Disclosed are a transition metal precursor for preparing a lithium composite transition metal oxide, a method for preparing the precursor, and a lithium composite transition metal oxide. The transition metal precursor includes a composite transition metal compound having a composition represented by Formula (1) and a Mn content of 60 to 85 mol %:

$$Ni_aM_bMn_{1-(a+b)}(OH_{1-x})_2 \quad (1)$$

where M is at least one selected from the group consisting of Ti, Co, Al, Cu, Fe, Mg, B, Cr, Zr, Zn and period II transition metals, $0.15 \leq a \leq 0.3$, $0 \leq b \leq 0.1$ and $0 < x < 0.5$. The lithium composite transition metal oxide has a composition represented by Formula (2) and a Mn content of 60 to 85 mol %:

$$Li_{1+z}[Ni_aM_bMn_{1-(a+b)}]_2O_{4-y}A_y \quad (2)$$

where M is at least one selected from the group consisting of Ti, Co, Al, Cu, Fe, Mg, B, Cr and period II transition metals, A is a monoanion or dianion, $0.15 \leq a \leq 0.3$, $0.005 \leq b \leq 0.1$, $-0.1 \leq z \leq 0.1$ and $0 \leq y \leq 0.1$.

16 Claims, 1 Drawing Sheet

(56) References Cited

FOREIGN PATENT DOCUMENTS

TW          201114095 A      4/2011
WO     WO 2009145471 A1 * 12/2009  ............. C01D 15/02

OTHER PUBLICATIONS

Yang, et al., "Electronic, Structural, and Electrochemical Properties of LiNixCuyMn2-x-yO4 (0<x<0.5, 0<y<0.5) High-Voltage Spinel Materials." Chemistry of Materials, vol. 23, No. 11, Jun. 14, 2011, pp. 2832-2841.

Arunkumar, et al., "Influence of Lattice Parameter Differences on the Electrochemical Performance of the 5 V Spinel LiMn1.5-yNi0.5-zMy+zO4 (M=Li, Mg, Fe, Co., and Zn)." Electrochemical and Solid State Letters, vol. 8, No. 8, Jan. 1, 2005, pp. A403-A405.

Yair Ein Eli, et al., "LiNixCu0.5-xMn1.5O4 Spinel Electrodes, Superior High-Potential Cathode Materials for Li Batteries: I. Electrochemical and Structural Studies." Journal of the Electrochemical Society, vol. 146, Jan. 1, 1999, pp. 908-913.

Fey, et al., "Preparation and electrochemical properties of high-voltage cathode material, LiMyNi0.5-yMn1.5O4 (M==Fe, Cu, Al, Mg; y=0.0-0.4)." Science Direct; Journal of Power Sources, vol. 115, No. 2, Apr. 10, 2003, pp. 332-345.

Dong Wook Shin, et al., "Role of Cation Ordering and Surface Segregation in High-Voltage Spinel LiMn1.5Ni0.5-xMxO4 (M=Cr, Fe, and Ga) Cathodes for Lithium-Ion Batteries." Chemistry of Materials, vol. 24, No. 19, Jul. 6, 2012, pp. 3720-3731.

Alcantara, et al. "Structural and Electrochemical Study of New LiNi0.5TixMn1.5-xO4 Spinel Oxides for 5-V Cathode Materials." Chemistry of Materials, American Chemical Society, vol. 15, No. 12, Jun. 17, 2003, pp. 2376-2382.

León, et al., "Structural and Lithium Extraction Mechanism in LiNi0.5Mn1.5O4 after Double Substitution with Iron and Titanium." Electrochemical and Solid-State Letters, vol. 9, No. 2, Feb. 1, 2006, pp. A96-A100.

Zhong, et al., "Electrochemical investigations of the LiNi0.45M0.10Mn1.45O4 (M=Fe, Co, Cr) 5 V cathode materials for lithium ion batteries." Journal of Power Sources, Elsevier SA, CH, vol. 205, Dec. 19, 2011, pp. 385-393.

J.H. Kim, et al., "Effect of Ti Substitution for Mn on the Structure of LiNi0.5Mn1.5-xTixO4 and Their Electrochemical Properties as Lithium Insertion Material." Journal of the Electrochemical Society, vol. 151, No. 11, Oct. 22, 2004, pp. A1911-A1918.

M.-H Lee, et al., "Synthetic optimization of Li[Ni1/3CoMn1/3]O2 via co-precipitation." Science Direct; Electrochemica Acta, Elsevier Science Publishers, vol. 50, Jan. 1, 2004, pp. 939-948.

Henry Lutz Ehrlich, et al., "Geomicrobiology." Fifth Ed. (2009), authorized translation from English Edition Language published by CDC Press, Prt of Taylor & Francis Group, LLC., pp. 363-364.

Extended Search Report from European Application No. 13816829.9, dated Jan. 8, 2016.

International Search Report from PCT/KR2013/005903, dated Sep. 23, 2013.

* cited by examiner

PRECURSOR FOR PREPARING LITHIUM COMPOSITE TRANSITION METAL OXIDE, METHOD FOR PREPARING THE PRECURSOR, AND LITHIUM COMPOSITE TRANSITION METAL OXIDE

CROSS REFERENCE TO RELATED APPLICATIONS

The present application is a continuation of International Application No. PCT/KR2013/005903 filed Jul. 3, 2013, which claims the benefit of the filing date of Korean Patent Application No. 10-2012-0074278 filed Jul. 9, 2012, the disclosures of which are hereby incorporated herein by reference.

TECHNICAL FIELD

The present invention relates to a precursor for preparing a lithium composite transition metal oxide, a method for preparing the precursor, and a lithium composite transition metal oxide.

BACKGROUND ART

Technological development and increased demand for mobile devices have led to rapid increase in the demand for secondary batteries as energy sources. Among such secondary batteries, lithium secondary batteries having high energy density and high discharge voltage have been extensively studied and are now commercially available and widely used. Lithium secondary batteries are the most commonly used due to superior electrode life and high rapid-charge/discharge efficiency.

Lithium-containing cobalt oxide ($LiCoO_2$) is typically used as a cathode active material for lithium secondary batteries and use of lithium-containing manganese oxides such as $LiMnO_2$ having a layered crystal structure and $LiMn_2O_4$ having a spinel crystal structure and lithium-containing nickel oxides ($LiNiO_2$) is also under consideration.

Among such cathode active materials, $LiCoO_2$ is currently widely used due to superior general properties such as excellent cycle characteristics, but has disadvantages such as low safety and high cost due to limited resource availability of cobalt as a raw material. Lithium nickel-based oxides such as $LiNiO_2$ have problems such as high manufacturing cost, swelling caused by gas generation in batteries, low chemical stability, and high pH although they are cheaper than $LiCoO_2$ and exhibit high discharge capacity when charged to 4.25V.

Lithium manganese oxides such as $LiMnO_2$ and $LiMn_2O_4$ have attracted a great deal of attention as cathode active materials capable of replacing $LiCoO_2$ due to advantages such as natural abundance of the raw materials and the use of eco-friendly manganese. Among these lithium manganese oxides, $LiMn_2O_4$ has advantages such as relatively low price and high output, but has lower energy density than $LiCoO_2$ and three-component active materials.

When Mn in $LiMn_2O_4$ is partially replaced by Ni to overcome such disadvantages, an operating potential of about 4.7 V, higher than the original operating potential of about 4 V, is achieved. A spinel material having a composition of $Li_{1+a}Ni_xMn_{2-x}O_{4-z}$ ($0 \leq a \leq 0.1$, $0.4 \leq x \leq 0.5$, $0 \leq z \leq 0.1$) has a high potential and, as such, is ideally suited for use as a cathode active material for middle or large-scale lithium ion batteries such as electric vehicles that require high energy and high output performance.

Lithium transition metal active materials containing two or more types of materials such as Ni and Mn are not easily synthesized by simple solid-state reaction. In a known technique, a transition metal precursor prepared by coprecipitation or the like is used as a precursor to prepare such lithium transition metal active materials.

However, a transition metal precursor for preparing the spinel material is not easily synthesized by coprecipitation since the transition metal precursor has a high content of Mn such that oxidation easily occurs due to oxygen dissolved in an aqueous transition metal solution.

Thus, a lithium composite transition metal oxide having satisfactory performance and a precursor for preparing such a lithium composite transition metal oxide have yet to be developed.

DISCLOSURE

Technical Problem

Therefore, the present invention has been made to solve the above and other technical problems that have yet to be solved.

As a result of intensive studies and various experiments, the present inventors discovered that, when a composite transition metal compound having a specific composition and a Mn content of 60 to 85 mol % is prepared by coprecipitation in a state in which a reductant is added, oxidation of Mn is prevented and the sphericity of the composite transition metal compound is increased while it is possible to synthesize a precursor having more uniform granularity and also that a secondary battery including a lithium composite transition metal oxide prepared using the precursor as a cathode active material exhibits increased initial discharge capacity and efficiency and improved output and service life characteristics. The present invention has been completed based on this discovery.

Technical Solution

In accordance with the present invention, the above and other objects can be accomplished by the provision of a transition metal precursor including a composite transition metal compound having a composition represented by Formula (1) and a Mn content of 60 to 85 mol %:

$$Ni_aM_bMn_{1-(a+b)}(OH_{1-x})_2 \qquad (1)$$

where M is at least one selected from the group consisting of Ti, Co, Al, Cu, Fe, Mg, B, Cr, Zr, Zn and period II transition metals, and $0.15 \leq a \leq 0.3$, $0 \leq b \leq 0.1$ and $0 < x < 0.5$.

In a specific embodiment, M may be Ti or Al.

In a specific embodiment, "a" may be equal to or greater than 0.2 and equal to or less than 0.25 and "x" may be, particularly, equal to or greater than 0.2 and less than 0.5 and, more particularly, equal to or greater than 0.3 and less than 0.5.

The composite transition metal compound of Formula (1) is a spinel-type composite transition metal compound having a high content of Mn wherein Mn is partially replaced by Ni or wherein Ti or Al is further included in the compound. Therefore, a precursor including the composite transition metal compound is particularly preferably used to prepare a cathode active material of a lithium secondary battery having superior rapid charging characteristics.

Thus, in a specific embodiment, the content of Mn in the composite transition metal compound may be, particularly, 70 to 80 mol %.

In a specific embodiment, the transition metal precursor according to the present invention may be configured such that the content of the composite transition metal compound is particularly 30% by weight or higher and, more particularly, 50% by weight or higher, based on the total amount of the transition metal precursor.

The composite transition metal compound represented by the above Formula (1) may be prepared, particularly, by coprecipitation in a state in which a basic substance and a reductant for preventing oxidation of Mn are added to an aqueous transition metal solution mixed with a transition metal-containing salt.

When coprecipitation is used in the method for preparing a transition metal precursor according to the present invention, a composite transition metal compound is prepared by simultaneously precipitating two or more types of transition metal elements using a precipitation reaction in an aqueous solution. In a specific embodiment, a composite transition metal compound including two or more types of transition metals may be prepared by mixing transition metal-containing salts in a desired molar ratio taking into consideration the contents of transition metals to form an aqueous solution, and adding a strong base such as sodium hydroxide, together with an additive such as an ammonia source when needed, to the aqueous solution to induce coprecipitation while keeping the pH of the aqueous solution in a basic range.

Here, average particle diameter, particle diameter distribution, and particle density may be controlled as desired by appropriately controlling temperature, pH, reaction time, slurry concentration, ion concentration, or the like. The pH range may be 9 to 13, preferably 9 to 12. Where appropriate, reaction may be performed in multiple steps.

In a specific embodiment, the average particle diameter of the composite transition metal compound may be 4 to 20 micrometers, particularly, 4 to 15 micrometers, and the tap density of the composite transition metal compound may be 0.8 to 2.5 g/cm$^3$ and, more particularly, 1.2 to 2.5 g/cm$^3$.

Average particle diameters outside the above range are not preferred since, when the average particle diameter of the composite transition metal compound is greater than 20 micrometers, reactivity with lithium is lowered such that it is difficult to achieve desired electrochemical performance and reaction time is significantly increased such that productivity is lowered, and, when the average particle diameter of the composite transition metal compound is less than 4 micrometers, particles are difficult to handle and there are limitations in preparation of an active material having a desired size.

A tap density of the composite transition metal compound in the above range is preferable since it is possible to increase capacity per unit volume while reducing side reaction with electrolyte.

However, when the content of Mn in the transition metal-containing salt is high based on the total amount of the transition metal as described above when the composite transition metal compound is prepared according to the present invention, there is a problem in that uniform precipitation of transition metal elements is difficult since oxidation easily occurs due to oxygen dissolved in the aqueous transition metal solution in the precursor preparation procedure.

Recognizing these problems, the present inventors conducted intensive studies based on a number of experiments and discovered that adding a reductant when preparing a composite transition metal compound having a high content of Mn prevents oxidation of Mn and increases sphericity of the composite transition metal compound, enabling synthesis of a precursor having higher granularity, and that preparing a composite transition metal oxide based on this method increases initial discharge capacity and efficiency and also improves output and service life characteristics.

In a specific embodiment, the reductant may be added in an amount of 0.01 to 10 mol % and, more particularly, 0.05 to 3 mol %, relative to the molar quantity of the aqueous transition metal solution. Addition of the reductant in an amount outside the above range is not preferred. When the reductant is added in an amount less than 0.01 mol %, the amount of the reductant is too small to achieve the intended effects of the reductant. When the reductant is added in an amount greater than 10 mol %, the amount of the reductant is too great such that the transition metal content in the precursor is lowered, degrading electrochemical characteristics after sintering.

In a specific embodiment, the reductant may include at least one selected from the group consisting of hydrazine, oxalic acid, ascorbic acid and a saccharide material. Particularly, the reductant may be a saccharide material.

The saccharide material may include at least one selected from the group consisting of fructose, sucrose, glucose, galactose, lactose, maltose, starch and dextrin. Particularly, the saccharide material may be sucrose.

When a saccharide material is used as the reductant, the saccharide material may be present, particularly, on the surface and/or inside of the transition metal precursor and, more particularly, at least a part of the saccharide material may be present in a closed pore formed in the transition metal precursor.

Since the reductant trapped in the closed pores in the transition metal precursor is carbonized such that the reductant partially remains in the transition metal precursor, the reductant may provide the effects of surface treatment of the transition metal precursor with carbon. Thus, the transition metal precursor according to the present invention has higher sphericity and more uniform granularity while achieving improved electrochemical characteristics after sintering.

In a specific embodiment, the transition metal-containing salt preferably has anions that easily decompose and evaporate upon sintering and may include sulfate or nitrate. Examples of the transition metal-containing salt include, but are not limited to, nickel sulfate, titanium sulfate, manganese sulfate, nickel nitrate, titanium nitrate and manganese nitrate.

Examples of the basic substance include, but are not limited to, sodium hydroxide, potassium hydroxide and lithium hydroxide. Preferably, sodium hydroxide is used as the basic substance.

The present invention also provides a method for preparing the composite transition metal compound described above.

Specifically, the transition metal precursor (or the composite transition metal compound included in the transition metal precursor) according to the present invention may be prepared by (i) mixing transition metal-containing salts for precursor preparation to prepare an aqueous transition metal solution, (ii) adding a reductant in an amount of 0.01 to 10 mol %, relative to the molar quantity of the aqueous transition metal solution, to the aqueous transition metal solution, followed by mixing, and (iii) adding a strong base to the aqueous transition metal solution mixed with the reductant to induce coprecipitation.

In a specific embodiment, an alkaline carbonate or an additive for forming a complex with a transition metal may be additionally added to the aqueous transition metal solution in the coprecipitation process. For example, an ammonium ion source, an ethylenediamine compound, a citric acid compound or the like may be used as the additive. Examples of the ammonium ion source include an ammonia solution, an aqueous ammonium sulfate solution and an aqueous ammonium nitrate solution. The alkaline carbonate may be selected from the group consisting of ammonium carbonate, sodium carbonate, potassium carbonate and lithium carbonate. A mixture of two or more of these carbonates may also be used as the alkaline carbonate as appropriate.

The amount of the additive or alkaline carbonate to be added may be determined taking into consideration the amount of transition metal-containing salt, pH and the like.

In an example, the present invention provides a lithium composite transition metal oxide that can be prepared from the transition metal precursor. Specifically, as a cathode active material for lithium secondary batteries, the lithium composite transition metal oxide may be prepared by mixing the transition metal precursor and a lithium precursor and sintering the resulting mixture under an oxidative atmosphere.

Here, the lithium composite transition metal oxide may be surface-treated with carbon since a composite transition metal oxide prepared using a reductant is used as a precursor for preparing the lithium composite transition metal oxide.

That is, when a saccharide material is used as the reductant, the saccharide reductant trapped in the closed pores in the transition metal precursor is carbonized such that the reductant partially remains in the transition metal precursor, thereby providing the effects of treating the lithium composite transition metal oxide prepared using the transition metal precursor with carbon, as described above. Thus, the carbon may be derived from the saccharide reductant.

Here, the lithium precursor is not particularly limited. For example, lithium hydroxide, lithium carbonate or lithium oxide may be used as the lithium precursor. The lithium precursor includes lithium carbonate ($Li_2CO_3$) and/or lithium hydroxide ($LiOH$).

A detailed description of the reaction conditions between a lithium-containing material and a transition metal precursor for preparing a lithium composite transition metal oxide is omitted herein since they are well known in the art.

The present invention also provides a lithium composite transition metal oxide having a composition represented by Formula (2) and a Mn content of 60 to 85 mol %:

$$Li_{1+z}[Ni_aM_bMn_{1-(a+b)}]_2O_{4-y}A_y \quad (2)$$

where M is at least one selected from the group consisting of Ti, Co, Al, Cu, Fe, Mg, B, Cr and period II transition metals, A is a monoanion or dianion,
0.15≤a≤0.3,
0.005≤b≤0.1,
−0.1≤z≤0.1, and
0≤y≤0.1.

That is, the present invention provides a lithium composite transition metal oxide in which Mn is partially replaced by amounts of Ni and M within specific ranges.

Here, in a specific embodiment, the lithium composite transition metal oxide may be surface-treated with carbon.

The lithium composite transition metal oxide is preferably used as an electrode active material for lithium secondary batteries. The lithium composite transition metal oxide may be used alone or in mixture with another known electrode active material for lithium secondary batteries.

The present inventors confirmed that the use of the lithium composite transition metal oxide as an electrode active material for lithium secondary batteries achieved advantages such as superior rapid-charging characteristics, high initial discharge capacity and efficiency, and improved output and service life characteristics.

Thus, the present invention provides a cathode, which includes the lithium composite transition metal oxide as a cathode active material, and a lithium secondary battery including the cathode.

For example, the cathode may be prepared by applying a mixture of a cathode active material according to the present invention, a conductive material and a binder to a cathode current collector, followed by drying. The mixture may further include a filler as needed.

The cathode current collector is generally manufactured to a thickness of 3 to 500 μm. Any cathode current collector may be used without particular limitation so long as high conductivity is provided without causing chemical changes in the battery. Examples of the cathode current collector include stainless steel, aluminum, nickel, titanium, sintered carbon, or aluminum or stainless steel surface-treated with carbon, nickel, titanium or silver. The cathode current collector may include fine irregularities on the surface thereof so as to enhance bonding force to the cathode active material. In addition, the cathode current collector may be provided in various forms such as a film, a sheet, a foil, a net, a porous structure, a foam or a nonwoven fabric.

The conductive material is commonly added in an amount of 0.01 to 20% by weight, based on the total weight of the mixture including the cathode active material. Any conductive material may be used without particular limitation so long as suitable conductivity is provided without causing chemical changes in the battery. Examples of the conductive material include graphite such as natural or artificial graphite, carbon blacks such as acetylene black, Ketjen black, channel black, furnace black, lamp black and thermal black, conductive fibers such as carbon fibers and metallic fibers, metallic powders such as carbon fluoride, aluminum and nickel powders, conductive whiskers such as zinc oxide and potassium titanate whiskers, conductive metal oxides such as titanium oxide and polyphenylene derivatives.

The binder is a component assisting in binding of an active material to a conductive material and a current collector. The binder is commonly added in an amount of 1 to 20% by weight, based on the total weight of the compound including the cathode active material. Examples of the binder include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymers (EPDM), sulfonated EPDM, styrene butadiene rubbers, fluoro-rubbers and various copolymers.

The filler is a component optionally used to inhibit expansion of the cathode. Any filler may be used without particular limitation so long as the filler is a fibrous material that does not cause chemical changes in the battery. Examples of the filler include olefin-based polymers such as polyethylene and polypropylene and fibrous materials such as glass fibers and carbon fibers.

The lithium secondary battery generally includes a cathode, an anode, a separator, and a lithium salt-containing non-aqueous electrolyte. Other components of the lithium secondary battery according to the present invention are described below.

For example, the anode may be prepared by applying an anode material to an anode current collector, followed by drying and pressing. Optionally, the anode may further include the components described above.

Examples of the anode material may include carbon such as non-graphitized carbon and graphitized carbon, metal composite oxides such as $Li_xFe_2O_3$ ($0 \leq x \leq 1$), $Li_xWO_2$ ($0 \leq x \leq 1$) and $Sn_xMe_{1-x}Me'_yO_z$(Me: Mn, Fe, Pb or Ge; Me': Al, B, P, Si, Group I, II and III elements of the Periodic Table or halogens; $0 \leq x \leq 1$, $1 \leq y \leq 3$, and $1 \leq z \leq 8$), lithium metal, lithium alloys, silicon-based alloys, tin-based alloys, metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, conductive polymers such as polyacetylene, and Li—Co—Ni based materials.

The anode current collector is generally fabricated to a thickness of 3 to 500 μm. Any anode current collector may be used without particular limitation so long as suitable conductivity is provided without causing chemical changes in the battery. Examples of the anode current collector include copper, stainless steel, aluminum, nickel, titanium, sintered carbon, copper or stainless steel surface-treated with carbon, nickel, titanium or silver and aluminum-cadmium alloys. Similar to the cathode current collector, the anode current collector may include fine irregularities on the surface thereof so as to enhance adhesion of anode active materials. In addition, the anode current collector may be provided in various forms such as a film, a sheet, a foil, a net, a porous structure, a foam and a nonwoven fabric.

The separator is interposed between the cathode and the anode. A thin insulating film having high ion permeability and mechanical strength is used as the separator. The separator typically has a pore diameter of 0.01 to 10 μm and a thickness of 5 to 300 μm. For example, a sheet or nonwoven fabric made of polyethylene or glass fibers or an olefin-based polymer such as polypropylene, which is chemically resistant and hydrophobic, is used as the separator. When a solid electrolyte such as a polymer electrolyte is used, the solid electrolyte may also serve as a separator.

The lithium salt-containing non-aqueous electrolyte includes a non-aqueous electrolyte and a lithium salt. A non-aqueous electrolyte solution, an organic solid electrolyte, an inorganic solid electrolyte or the like may be used as the non-aqueous electrolyte.

Examples of the non-aqueous electrolyte solution include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include organic solid electrolytes such as polyethylene derivatives, polyethylene oxide derivatives, polypropylene oxide derivatives, phosphoric acid ester polymers, polyagitation lysine, polyester sulfide, polyvinyl alcohol, polyvinylidene fluoride, and polymers containing ionic dissociation groups.

Examples of the inorganic solid electrolyte include inorganic solid electrolytes such as nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrroles, 2-methoxy ethanol, aluminum trichloride or the like may be added to the non-aqueous electrolyte. If necessary, in order to impart incombustibility, the non-aqueous electrolyte may further include a halogen-containing solvent such as carbon tetrachloride or ethylene trifluoride. Further, in order to improve high-temperature storage characteristics, the non-aqueous electrolyte may additionally include carbon dioxide gas.

The present invention provides a battery module including the lithium secondary battery as a unit cell and provides a battery pack including the battery module.

The battery pack may be used as a power source of a middle or large-scale device that requires high temperature stability, long cycle characteristics, high rate characteristics and the like.

Preferred examples of the middle or large-scale devices include, but are not limited to, power tools that are powered by electrical motors, electric vehicles (EVs) including hybrid electric vehicles (HEVs) and plug-in hybrid electric vehicles (PHEVs), electric two-wheeled vehicles including electric bikes (E-bikes) and electric scooters (E-scooters), electric golf carts and power storage systems.

BRIEF DESCRIPTION OF THE DRAWINGS

The above and other objects, features and other advantages of the present invention will be more clearly understood from the following detailed description taken in conjunction with the accompanying drawings, in which.

BEST MODE

Figure 1:
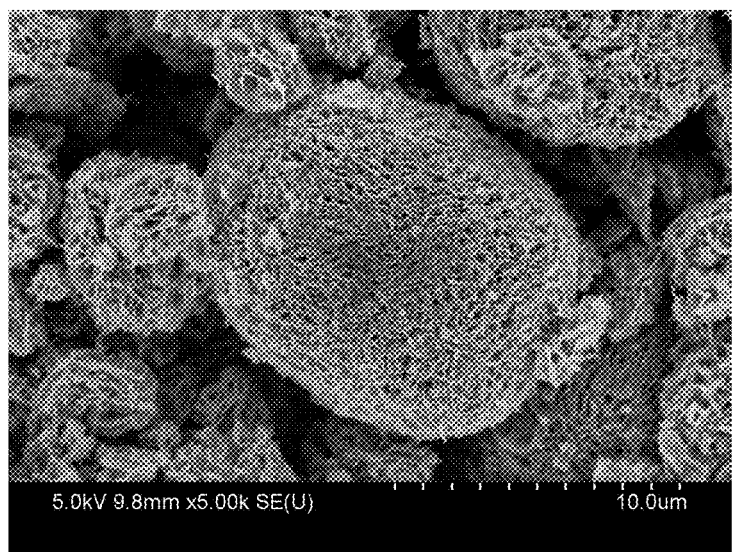
FIG. 1 is an SEM image of a precursor prepared in Example 1 that was captured using an FE-SEM (Hitachi, S-4800 model)

The present invention will now be further described through examples. However, it should be noted that the following examples are given only to exemplify the present invention and the scope of the invention is not limited thereto.

Example 1

A 4 L wet reactor tank was filled with 3 L of distilled water and nitrogen gas was continuously introduced into the tank at a rate of 2 L/min to remove dissolved oxygen. Here, distilled water in the tank was maintained at a temperature of 45 to 50'C using a temperature maintaining device. In addition, the distilled water in the tank was stirred at a rate of 1000 to 1200 rpm using an impeller connected to a motor installed outside the tank.

Nickel sulfate, titanium sulfate and manganese sulfate were mixed in a (molar) ratio of 0.25:0.04:0.71 to prepare a 2M aqueous transition metal solution. Here, the aqueous transition metal solution was also mixed with 0.2 mol % of sucrose. In addition, a 4 M aqueous sodium hydroxide solution was prepared. The aqueous transition metal solution was continuously pumped into the wet reactor tank at a rate of 0.18 L/hr by a metering pump. The aqueous sodium hydroxide solution was pumped in a variable-rate manner by a control unit to control the pH of the distilled water in the wet reactor tank such that the distilled water in the wet reactor tank was maintained at a pH of 11.0 to 11.5. Here, a 30% ammonia solution as an additive was continuously pumped together to the reactor at a rate of 0.035 to 0.04 L/hr.

Flow rates of the aqueous transition metal solution, the aqueous sodium hydroxide solution and the ammonia solution were controlled such that an average residence time of the solutions in the wet reactor tank was 5 to 6 hours. After the reaction in the tank reached a steady state, the reaction was allowed to proceed for a certain amount of time to obtain a composite transition metal precursor with higher density.

A nickel-titanium-manganese composite transition metal precursor, which was prepared through 20-hour continuous reaction between transition metal ions of the aqueous transition metal solution, hydroxide ions of the aqueous sodium hydroxide solution and ammonia ions of the ammonia solution after the steady state was reached, was continuously obtained through an overflow pipe installed to the side of the tank near the top.

The composite transition metal precursor obtained in this manner was washed several times with distilled water and dried in a 120'C constant-temperature drying oven for 24 hours to obtain a nickel-titanium-manganese composite transition metal precursor of $Ni_{0.25}Ti_{0.04}Mn_{0.71}(OH_{1-x})_2$ having an average particle diameter of 7 micrometers and a tap density of 2.0 g/cm$^3$.

Comparative Example 1

A nickel-titanium-manganese composite transition metal precursor of $Ni_{0.25}Ti_{0.04}Mn_{0.71}(OH_{1-x})_2$ was prepared in the same manner as Example 1, except that an aqueous transition metal solution was not mixed with sucrose. The average particle diameter of the prepared nickel-titanium-manganese composite transition metal precursor was 8 micrometers and the tap density thereof was 0.6 g/cm$^3$.

Comparative Example 2

A nickel-titanium-manganese composite transition metal precursor of $Ni_{0.25}Ti_{0.04}Mn_{0.71}(OH_{1-x})_2$ was prepared in the same manner as Example 1, except that an aqueous transition metal solution was mixed with 20 mol % of sucrose. The average particle diameter of the prepared nickel-titanium-manganese composite transition metal precursor was 28 micrometers and the tap density thereof was 0.75 g/cm$^3$.

Experimental Example 1

Figure 2:
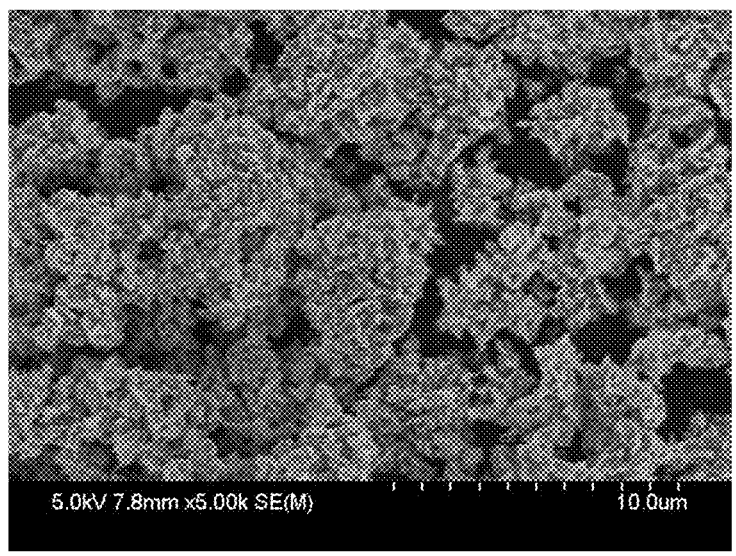
FIG. 2 is an SEM image of a precursor prepared in Comparative Example 1 that was captured using an FE-SEM (Hitachi, S-4800 model).

SEM images of the precursors prepared in Example 1 and Comparative Example 1, which are shown in FIGS. 1 and 2, were captured using an FE-SEM (Hitachi, S-4800 model).

From FIGS. 1 and 2, it can be seen that the precursor of Example 1 prepared using 0.2 mol % of sucrose has more spherical particles due to improved cohesion of primary particles, as compared to the precursor of Comparative Example 1 prepared without mixing with sucrose.

Example 2 and Comparative Examples 3 and 4

Coin Cell Fabrication

In Example 2 and Comparative Examples 3 and 4, respectively, the nickel-titanium-manganese composite transition metal precursors prepared in Example 1 and Comparative Examples 1 and 2 were mixed with $Li_2CO_3$ in respective molar ratios according to the compositions of the precursors and $Li_2CO_3$. Each mixture was heated at an elevation rate of 5° C./min and sintered at 950° C. for 10 hours to prepare a cathode active material powder of $Li[Ni_{0.25}Ti_{0.04}Mn_{0.71}]_2O_4$.

The prepared cathode active material powder, a conductive material (Denka Black) and a binder (KF1100) were mixed in a weight ratio of 95:2.5:2.5 to prepare a slurry. The slurry was uniformly applied to Al foil having a thickness of 20 μm. The slurry-coated Al foil was dried at 130° C. to form a cathode for lithium secondary batteries.

A 2016 coin cell was fabricated using the formed cathode for lithium secondary batteries, a lithium metal foil as a counter electrode (anode), a polyethylene film (Celgard, thickness: 20 μm) as a separator, and a liquid electrolyte including 1M $LiPF_6$ dissolved in a solvent in which ethylene carbonate, dimethylene carbonate and diethyl carbonate were mixed in a ratio of 1:2:1.

Example 3

Coin Cell Fabrication

Each nickel-titanium-manganese composite transition metal precursor prepared in Example 1 was mixed with 110 mol % of $Li_2CO_3$ and 5 mol % of $NH_4F$, relative to the precursor, in a molar ratio according to the compositions of the precursor, $Li_2CO_3$ and $NH_4F$. Each mixture was heated at an elevation rate of 5° C./min and sintered at 950° C. for 10 hours to prepare a cathode active material powder of $Li_{1.1}[Ni_{0.25}Ti_{0.04}Mn_{0.71}]_2O_{3.95}F_{0.05}$.

The prepared cathode active material powder, a conductive material (Denka Black) and a binder (KF1100) were mixed in a weight ratio of 95:2.5:2.5 to prepare a slurry. The slurry was uniformly applied to Al foil having a thickness of 20 μm. The slurry-coated Al foil was dried at 130° C. to form a cathode for lithium secondary batteries.

A 2016 coin cell was fabricated using the formed cathode for lithium secondary batteries, a lithium metal foil as a counter electrode (anode), a polyethylene film (Celgard, thickness: 20 μm) as a separator, and a liquid electrolyte including 1M $LiPF_6$ dissolved in a solvent in which ethylene carbonate, dimethylene carbonate and diethyl carbonate were mixed in a ratio of 1:2:1.

Experimental Example 2

Initial Charge/Discharge Characteristics

The characteristics of the cathode active material of each of the coin cells fabricated in Examples 2 and 3 and Comparative Examples 3 and 4 were evaluated using an electrochemical analyzer (Toyo System, Toscat 3100U) in a voltage range of 3.5 to 4.9 V.

For battery estimation, charge/discharge capacity was measured in the voltage range of 3.5 to 4.9 V at an applied current of 0.1 C. Discharge capacity and charge/discharge efficiency results are shown in Table 1 below.

TABLE 1

| Sample | Initial Charge Capacity (mAh/g) | Initial Discharge Capacity (mAh/g) | Initial Charge/Discharge Efficiency (%) |
|---|---|---|---|
| Ex. 2 | 147.5 | 143.2 | 97.1 |
| Comp. Ex. 3 | 147.2 | 141.8 | 96.3 |
| Comp. Ex. 4 | 125.1 | 110.6 | 88.4 |
| Ex. 3 | 147.3 | 143.8 | 97.6 |

It can be seen from Table 1 that batteries of Examples 2 and 3, in which 0.2 mol % of sucrose was added to prepare the precursor, exhibited similar initial charge/discharge capacity and efficiency higher than those of Comparative Example 3 in which no reductant was added and Comparative Example 4 in which an excessive amount of sucrose was added. It can also be seen that Comparative Example 4 in which an excessive amount of sucrose was added exhibited much lower initial charge/discharge capacity and efficiency than Comparative Example 3 in which no reductant was added. This is believed to be due to the fact that the content of transition metal in the precursor decreases as an excessive amount of reductant is added.

Experimental Example 3

Service Life Characteristics

Each of the coin cells fabricated in Examples 2 and 3 and Comparative Examples 3 and 4 was charged/discharged 50 times at a current of 1.0 C and service life characteristics thereof were evaluated. Evaluation results are shown in Table 2 below.

TABLE 2

| | Service Life Characteristics 50th/1st Discharge Capacity (%) |
|---|---|
| Ex. 2 | 99.5 |
| Comp. Ex. 3 | 97.2 |
| Comp. Ex. 4 | 91.7 |
| Ex. 3 | 99.8 |

As can be seen from Table 2, batteries of Examples 2 and 3, in which 0.2 mol % of sucrose was added, exhibited similar discharge capacity of almost 100%, achieving superior service life characteristics to those of Comparative Example 3 in which no reductant was added and Comparative Example 4 in which an excessive amount of sucrose was added. Particularly, it can be seen that Comparative Example 4 in which an excessive amount of sucrose was added exhibited much lower initial charge/discharge capacity and efficiency than Comparative Example 3 in which no reductant was added. This is believed to be due to the fact that the content of transition metal in the precursor decreases as an excessive amount of reductant is added.

Experimental Example 4

Output Characteristics

Each of the coin cells fabricated in Examples 2 and 3 and Comparative Examples 3 and 4 was discharged at a current of 2.0 C after being charged/discharged at a current of 0.1 C and output characteristics thereof were evaluated. Evaluation results are shown in Table 3 below.

TABLE 3

| | 0.1C Discharge Capacity (mAh/g) | 2C Discharge Capacity (mAh/g) | Output Characteristics 0.1C/2.0C (%) |
|---|---|---|---|
| Ex. 2 | 143.2 | 140.6 | 98.2 |
| Comp. Ex. 3 | 141.8 | 135.7 | 95.7 |
| Comp. Ex. 4 | 110.6 | 100.2 | 90.6 |
| Ex. 3 | 143.8 | 142.5 | 99.1 |

As can be seen from Table 3, batteries of Examples 2 and 3, in which 0.2 mol % of sucrose was added, exhibited similar output characteristics higher than those of Comparative Example 3 in which no reductant was added and Comparative Example 4 in which an excessive amount of sucrose was added. Particularly, it can be seen that Comparative Example 4 in which an excessive amount of sucrose was added exhibited much lower initial charge/discharge capacity and efficiency than Comparative Example 3 in which no reductant was added. This is believed to be due to the fact that the content of transition metal in the precursor decreases as an excessive amount of reductant is added.

It will be apparent to those skilled in the art that various modifications and variations are possible in light of the above teaching without departing from the scope of the invention.

INDUSTRIAL APPLICABILITY

As is apparent from the above description, a transition metal precursor for preparing a lithium composite transition metal oxide according to the present invention is prepared by coprecipitation in a state in which a reductant is added to prevent oxidation of Mn. Therefore, it is possible to synthesize a composite transition metal compound having a specific composition and a Mn content of 60 to 85 mol %, which achieves higher sphericity and more uniform granularity. Particularly, when a saccharide reductant is used, the reductant can remain in a closed pore in the transition metal precursor, providing effects of surface treatment with carbon. Therefore, it is also possible to improve electrochemical characteristics of the cathode active material after sintering.

In addition, when a lithium composite transition metal oxide is prepared using the precursor prepared in the above manner, a secondary battery including the lithium composite transition metal oxide exhibits increased initial discharge capacity and efficiency and improved output and service life characteristics.

The invention claimed is:

1. A transition metal precursor comprising a composite transition metal compound having a composition represented by Formula (1) and a Mn content of 60 to 85 mol %:

$$Ni_aM_bMn_{1-(a+b)}(H_{1-x})_2 \qquad (1)$$

where M is at least one selected from the group consisting of Ti, Co, Al, Cu, Fe, Mg, B, and Cr,
$0.15 \leq a \leq 0.3$,
$0 \leq b \leq 0.1$, and
$0 < x < 0.5$; and
a saccharide material present on the surface and/or inside of the transition metal precursor wherein at least part of the saccharide material is present in a closed pore formed in the metal transition precursor, and wherein a tap density of the composite transition metal compound is 0.8 to 2.5 g/cm$^3$.

2. The transition metal precursor according to claim 1, wherein M is Ti or Al.

3. The transition metal precursor according to claim 1, wherein a is equal to or greater than 0.2 and equal to or less than 0.25.

4. The transition metal precursor according to claim 1, wherein the Mn content is 70 to 80 mol %.

5. The transition metal precursor according to claim 1, wherein x is equal to or greater than 0.2 and less than 0.5.

6. The transition metal precursor according to claim 1, wherein x is equal to or greater than 0.3 and less than 0.5.

7. The transition metal precursor according to claim 1, wherein an average particle diameter of the composite transition metal compound is 4 to 20 micrometers.

8. The transition metal precursor according to claim 1, wherein the composite transition metal compound is prepared by coprecipitation in a state in which a basic substance and the saccharide material for preventing oxidation of Mn are added to an aqueous transition metal solution mixed with a transition metal-containing salt.

9. The transition metal precursor according to claim 8, wherein the saccharide material is added in an amount of 0.01 to 10 mol % relative to the molar quantity of the aqueous transition metal solution.

10. The transition metal precursor according to claim 8, wherein the transition metal-containing salt comprises sulfate and the basic material comprises sodium hydroxide.

11. The transition metal precursor according to claim 10, wherein the sulfate comprises at least one selected from the group consisting of nickel sulfate, titanium sulfate and manganese sulfate.

12. The transition metal precursor according to claim 1, wherein the saccharide material comprises at least one selected from the group consisting of fructose, sucrose, glucose, galactose, lactose, maltose, starch and dextrin.

13. The transition metal precursor according to claim 1, wherein the saccharide material comprises sucrose.

14. The transition metal precursor according to claim 1, wherein the content of the composite transition metal compound is 30% by weight or higher, based on the total amount of the transition metal precursor.

15. The transition metal precursor according to claim 14, wherein the content of the composite transition metal compound is 50% by weight or higher.

16. A method for preparing the composite transition metal compound of the transition metal precursor according to claim 1, the method comprising:
(i) preparing an aqueous transition metal solution containing a transition metal salt for precursor preparation;
(ii) mixing, with the aqueous transition metal solution, 0.01 to 10 mol % of a reductant relative to the molar quantity of the aqueous transition metal solution; and
(iii) adding a strong base to the aqueous transition metal solution mixed with the reductant to induce coprecipitation.

* * * * *